United States Patent [19]

Tomikawa

[11] Patent Number: 4,665,533
[45] Date of Patent: May 12, 1987

[54] DIGITAL SIGNAL TRANSMISSION SYSTEM

[75] Inventor: Naohiro Tomikawa, Amagasaki, Japan

[73] Assignee: Mitsubishi Denki Kabushiki Kaisha, Tokyo, Japan

[21] Appl. No.: 589,868

[22] Filed: Mar. 19, 1984

Related U.S. Application Data

[63] Continuation of Ser. No. 471,603, Mar. 8, 1983, which is a continuation of Ser. No. 137,805, Apr. 4, 1980.

[30] Foreign Application Priority Data

Apr. 10, 1979 [JP] Japan .................. 54-43882

[51] Int. Cl.⁴ .............................. H04L 7/00
[52] U.S. Cl. .................. 375/106; 370/105; 370/106; 364/728
[58] Field of Search ............... 375/108, 110, 112, 113, 375/114, 116; 370/101, 103, 105, 106; 371/37, 42, 46, 52, 55; 364/728, 819

[56] References Cited

U.S. PATENT DOCUMENTS

| | | | |
|---|---|---|---|
| 3,200,198 | 8/1965 | McRae | 370/103 |
| 3,883,729 | 5/1975 | DeCremiers | 375/116 |
| 3,896,265 | 7/1975 | Hara | 375/114 |
| 4,013,836 | 3/1977 | Williams | 370/106 |
| 4,027,243 | 5/1977 | Stackhouse | 375/114 |
| 4,091,423 | 5/1978 | Branscome | 375/116 |

FOREIGN PATENT DOCUMENTS 1233433 6/1964 Fed. Rep. of Germany .

OTHER PUBLICATIONS

Hiroshi Inose, "Elementary Technology of PCM Commmunication and Improvement Thereof", pp. 254–255, 264–273.
H. B. Mann, "Error Correcting Codes", An Essay by Turyn on p. 213, Sequences with Small Correction, published by John Wiley & Sons.

*Primary Examiner*—Robert L. Griffin
*Assistant Examiner*—Stephen Chin
*Attorney, Agent, or Firm*—Oblon, Fisher, Spivak, McClelland & Maier

[57] ABSTRACT

Serially transmitted digital signal train is divided into frames and each frame synchronous code signal is given to each frame and plural frames are grouped to form blocks and each block synchronous code signal is given to each block to transmit the data. The first and second frame synchronous code signals having a small cross correlation function in the same code length are used in said transmission system. The first frame synchronous code signal is used only for the top frame of the block and the second frame synchronous code signal is used for the other frames. The first frame synchronous code signal is used for both of the frame synchronism and the block synchronism whereby it is unnecessary to use different block synchronous code signals to prevent the increase of transmission redundancy and to increase transmission efficiency.

1 Claim, 7 Drawing Figures

FIG. 5
| 31 | 1|1|1|1|0|0|1|1|0|1|0|1|1|0 |
| 32 | 0|0|0|0|0|1|1|0|0|1|0|1|0|0|1 |
FIG. 6
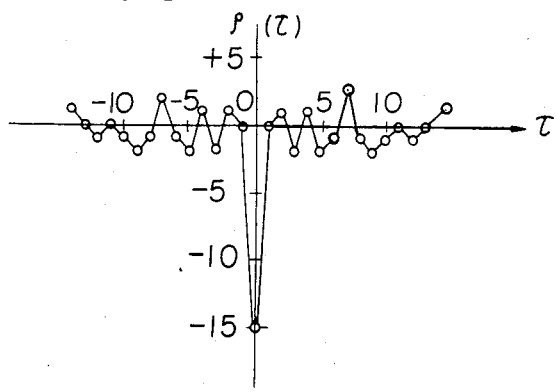
FIG. 7
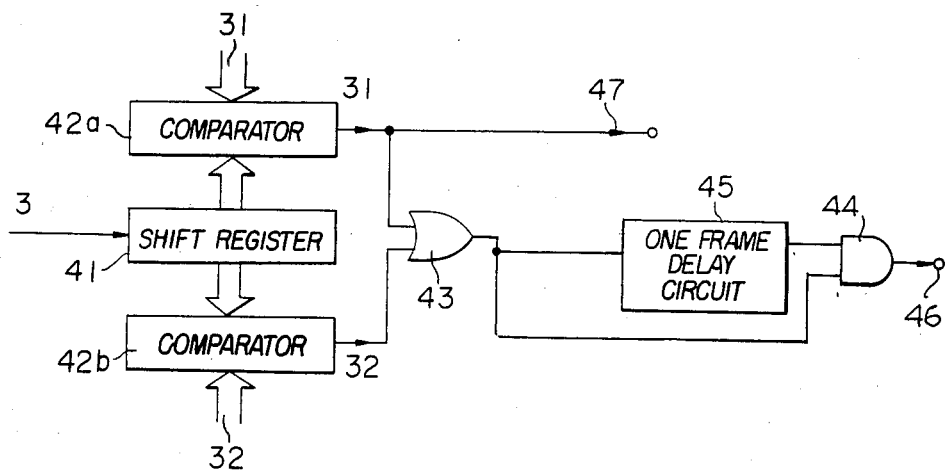

DIGITAL SIGNAL TRANSMISSION SYSTEM

This application is a continuation of application Ser. No. 471,603, filed Mar. 8, 1983 which is a continuation of application Ser. No. 137,805 filed Apr. 4, 1980.

BACKGROUND OF THE INVENTION

The present invention relates to a digital signal transmission system. More particularly, it relates to a data synchronizing system.

The conventional data synchronizing system in the serial transmission system will be illustrated by a simple example.

FIG. 1 shows one embodiment of a data stream. FIG. 2 shows a diagram of a simple block codification. FIG. 3 shows a diagram of a transmission format. The reference numeral(1) designates a data stream; (11) designates a message; (12) designates a vertical parity; (13) designates a horizontal parity;(2) designates a transmission format; (20) designates a frame synchronous code; (21) designates a first frame data; (22) designates a second frame data;(23) designates a third frame data; (24) designates a fourth frame data; and (25) designates a block synchronous code. The following case is considered. The data stream is made of continuous messages (11) having 12 bits shown in FIG. 1 and the message is arranged into 3 rows 4 columns matrlx shown in FIG. 2 and vertical and horizontal parities are given to arrange 4 by 5 matrix and each row is transmitted as one frame. In order to determine which is the first bit of the frame, each frame synchronous code (20)is given. The matrix is considered as one block A block synchronous code (25) for synchronizing the blocks should be given. This is a simple example. In usual, coded trains having block structure are transmitted, a block synchronous code (25) should be given beside the frame synchronous codes (20). The code length of the block synchronous code (25) must be long so as to select without disturbance of the frame correlation of the frame synchronous code (20) whereby the redundancy of codes is high to decrease the transmission efficiency.

SUMMARY OF THE INVENTION

The object of the present invention is to overcome the disadvantages of the conventional data synchronizing system and to provide both of a frame synchronism and a block synchronism by using two or more different patterns of frame synchronous code signals having a small cross correlation fuction in the same code length.

The digital signal trains for serial transmission are divided into frames and each frame synchronizing code is given two each frame and plural frames are grouped to form each block and the block synchronizing code is given to the block to transmit them.

In such transmission system, the first and second frame synchronizing codes having a small cross correlation function in the same code length are used. The first frame synchronizing code is used only for the top frame of the block and the second frame synchronizing code is used for the other frames. That is, the first frame synchronizing code imparts the frame synchronism an block synchronism. Therefore, it is unnecessary to give another block synchronous code signal whereby the increase of transmission redundancy is prevented and the transmission efficiency can be increased.

BRIEF DESCRIPTION OF THE DRAWINGS

FIG. 5 shows one embodiment of two kinds of synchronous paterns having a small cross correlation function used in the present invention;

FIG. 6 shows cross correlation functions of two patterns; and

FIG. 7 a block diagram of one embodiment of the data synchronizing circuit according to the present invention.

DESCRIPTION OF THE PREFERRED EMBODIMENTS

Figure 1:
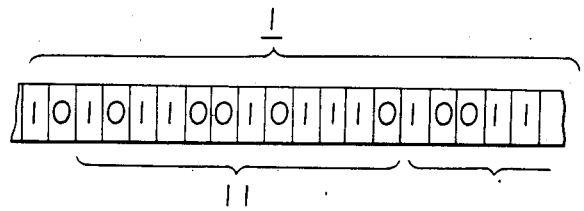
FIG. 1 shows one embodiment of the data stream.
Figure 2:
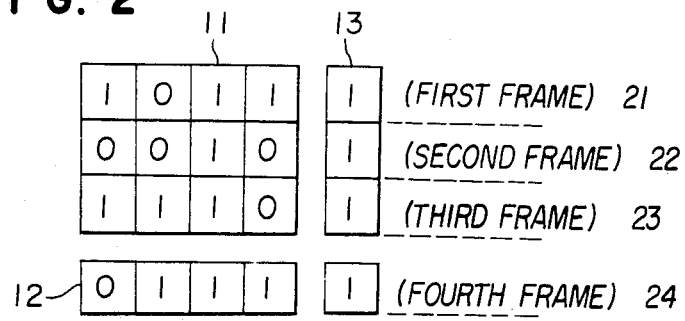
FIG. 2 shows one embodiment of block codification of the data stream of FIG. 1.
Figure 3:
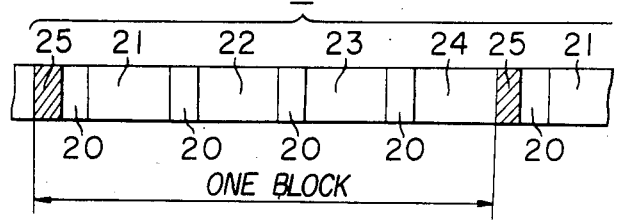
FIG. 3 shows one embodiment of the conventional transmission format for transmiting the code columns of FIG. 2.
Figure 4:
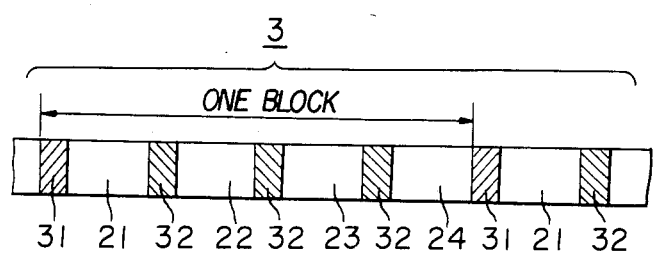
FIG. 4 shows one embodiment of a transmission format of the present invention.

FIG. 4 shows one embodiment of the serial transmission format according to the present invention. FIG. 5 shows one embodiment of the two frame synchronous code signals used in the present invention. FIG. 6 shows a non-periodic cross correlation function $\rho(\tau)$ of the two synchronous code patterns of FIG. 5.

The two synchronous code patterns are referred to as Sync. A (31) and Sync. B (32). The Sync A (31)is formed only for the frame synchronous code signal just before the first frame (21) and the Sync. B (32) is formed for the other frame synchronous code signals. The block synchronism is obtained by repeating the Sync. A. When the pattern having a small cross correlation function $\rho(\tau)$ shown in FIG. 5 is used for the two synchronous pattern Sync. A and Sync. B, the possibility of erroneous selection of the frame synchronism and the block synchronism is quite small even in the erroneous transmission line. FIG. 7 shows one embodiment of a practical data synchronizing circuit wherein the reference numeral (3) designates a receiving signal train, (41) designates a serial Inparallel out shift register; (42a), (42b) designates comparators; (43) designates an OR gate, (44) designates an AND gate; (45) designates a one frame delay circuit; (46) designates a frame synchronous pulse; (47) designates a block synchronous pulse.

The receiving signal train (3) is input into the shift registor (41) to monitor a transmission of the pattern corresponding to the Sync. A(31) or Sync. B(32) by the comparators (42a), (42b). When the correspondency is found in one of the comparators, the output is passed through the OR gate (48) to the AND gate (44). The pulse passed through the one frame delay circuit (45) is applied as the other input of the AND gate. Only when the output pulse of the OR gate (43) has correlation to the pulse for one prior frame, the frame synchronous pulse (46) is ouput. On the other hand the signal pulse (47) corresponding to the Sync. A (31)is output as the block synchronous pulse.

As described above according to the data synchronization system of the present invention, the frame synchronism and the block synchronism are simultaneously obtained by using two frame synchronous patterns having small cross correlation functions $\rho(\tau)$ such as orthogonal code sequence or PN sequences as noted by Hsiao et al, *IBM Technical Disclosure Bulletin,* Vol. 13, No. 11, Apr. 1977, pp. 3544–3546. For further information concerning how specific correlation detection circuits may be implemented in the practice of the present invention, reference is made to prior art U.S. Pat. Nos. 3,598,979, 3,701,894 and 4,032,885 the subject matter of which is incorporated by reference herein. The data synchronization can be simply attained. It is unnecessary to give different block synchronous code signals whereby the transmission redundancy can be advantageously lower.

In the embodiment of FIG. 7, the correlation is given only for the frame synchronism to prevent erroneous synchronism caused by the transmission error. Thus, the correlation can be also given by the similar manner for the block synchronism.

I claim:

1. In a digital signal transmission system for transmitting data by dividing a digital data signal train into frames, giving respectively frame synchronous code signals to said frames, grouping said frames into blocks; and giving a block synchronous code signal to each block, the improvement comprising:

selecting a first code pattern only for said frame synchronous code signals and a second code pattern for said block synchronous code signal and for said frame synchronous code signals, said first and second code patterns exhibiting a low cross-correlation function;

transmitting said data with only said second code pattern of said first and second code patterns inserted prior to each data block and only said first code pattern of said first and second code patterns inserted prior to each data frame within each block;

receiving and detecting each of said first and said second code patterns to produce respective first and second detection signals upon detection thereof;

combining said first and second detection signals to produce a frame synchronization signal used for frame synchronization of each data frame; and using said second detection signal for block synchronization of each data block.

* * * * *